(12) United States Patent
Sayama

(10) Patent No.: US 8,287,024 B2
(45) Date of Patent: Oct. 16, 2012

(54) SEAT LOCKING DEVICE AND STOWABLE VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 154 days.

(21) Appl. No.: 12/921,014

(22) PCT Filed: Mar. 24, 2009

(86) PCT No.: PCT/JP2009/055826
§ 371 (c)(1),
(2), (4) Date: Sep. 3, 2010

(87) PCT Pub. No.: WO2009/119584
PCT Pub. Date: Oct. 1, 2009

(65) Prior Publication Data
US 2011/0018326 A1      Jan. 27, 2011

(30) Foreign Application Priority Data

Mar. 24, 2008  (JP) ................................ 2008-076326
Mar. 24, 2008  (JP) ................................ 2008-076328

(51) Int. Cl.
*B60N 2/02* (2006.01)
(52) U.S. Cl. .................... 296/65.03; 296/65.05; 297/15; 297/331
(58) Field of Classification Search ............... 296/65.05, 296/65.09, 65.03, 65.08, 65.16, 69; 297/15, 297/378.12, 344.1, 334, 331, 378.13, 335; 248/421
See application file for complete search history.

(56) References Cited

U.S. PATENT DOCUMENTS

| | | | | |
|---|---|---|---|---|
| 5,662,368 A * | 9/1997 | Ito et al. | ..................... | 296/65.05 |
| 6,318,784 B2 * | 11/2001 | Nishide | ....................... | 296/65.09 |
| 6,375,255 B1 * | 4/2002 | Maruta et al. | ................... | 297/15 |
| 6,869,138 B2 * | 3/2005 | Rhodes et al. | .................. | 297/15 |
| 7,014,260 B2 * | 3/2006 | Moriyama et al. | .............. | 297/15 |
| 7,134,725 B2 * | 11/2006 | Hofmann et al. | .......... | 297/378.1 |
| 7,152,900 B2 * | 12/2006 | Trombley et al. | .......... | 296/65.09 |
| 7,152,922 B2 * | 12/2006 | Garland | ................... | 297/362.11 |
| 7,201,425 B2 * | 4/2007 | Tsujibayashi et al. | ..... | 296/65.09 |
| 7,201,426 B2 * | 4/2007 | Villeminey | ................ | 296/65.09 |
| 7,252,320 B2 * | 8/2007 | Tsujibayashi et al. | ..... | 296/65.09 |

(Continued)

FOREIGN PATENT DOCUMENTS

JP      01-148933 U      10/1989

(Continued)

*Primary Examiner* — Lori Lyjak
(74) *Attorney, Agent, or Firm* — Drinker Biddle & Reath LLP

(57) ABSTRACT

Rattling of a stowable vehicle seat in a stowed state during driving is prevented, and a seat locking device and a stowable vehicle seat that reduces a returning operation load and improves returning operability is provided. The seat locking device includes a stowage locking member disposed on the rear face side of a seat back and lockable to and unlockable from the vehicle body floor side in stowage of a seat, a pulling-up grip disposed on the rear face side of a seat cushion and operated in a returning operation of the seat, a movable member moved in conjunction with the pulling-up grip in the returning operation, and a stowage unlocking wire that connects the stowage locking member and the movable member, and lock of the stowage locking member is unlocked through a stowage unlocking wire by movement of the movable member in the returning operation.

7 Claims, 17 Drawing Sheets

U.S. PATENT DOCUMENTS

| | | | |
|---|---|---|---|
| 7,290,822 B2 * | 11/2007 | Villeminey | 296/65.09 |
| 7,328,939 B2 * | 2/2008 | Moriyama et al. | 297/15 |
| 7,367,624 B2 * | 5/2008 | Garland | 297/362.11 |
| 7,537,260 B2 * | 5/2009 | Epaud | 296/65.09 |
| 7,600,801 B2 * | 10/2009 | Lehy et al. | 296/65.08 |
| 7,699,399 B2 * | 4/2010 | Satta et al. | 297/378.12 |
| 2001/0052718 A1 | 12/2001 | Sugiura et al. | |

FOREIGN PATENT DOCUMENTS

| | | |
|---|---|---|
| JP | 11-048839 A | 2/1999 |
| JP | 11-310068 A | 11/1999 |
| JP | 2006-082698 A | 3/2006 |
| JP | 2007-045213 A | 2/2007 |
| JP | 2007-055586 A | 3/2007 |

* cited by examiner

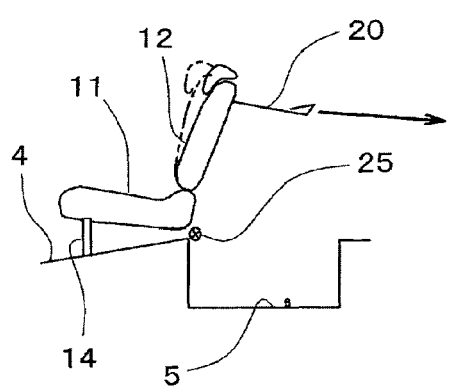
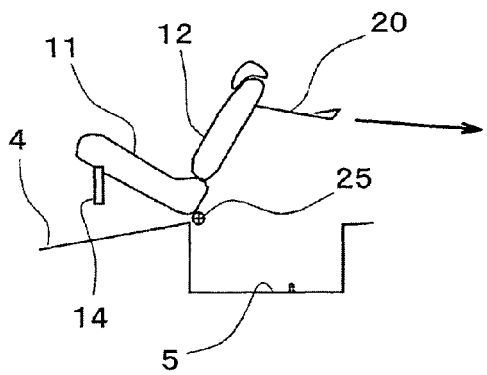
FIG. 12A  FIG. 12B
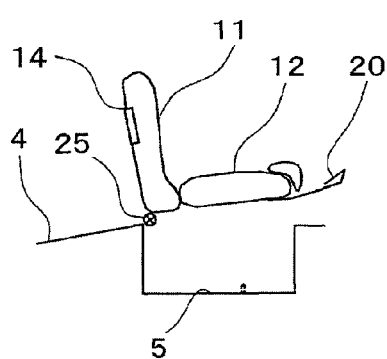
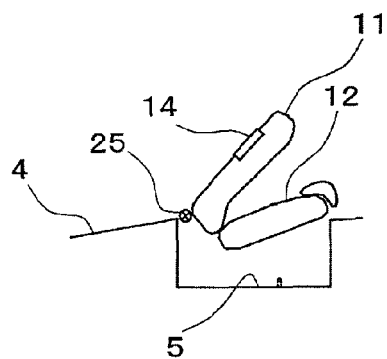
FIG. 12C  FIG. 12D
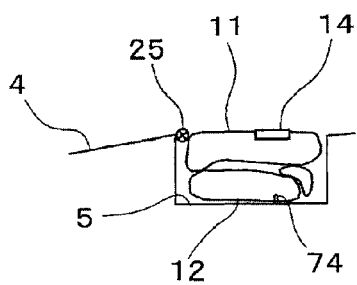
FIG. 12E

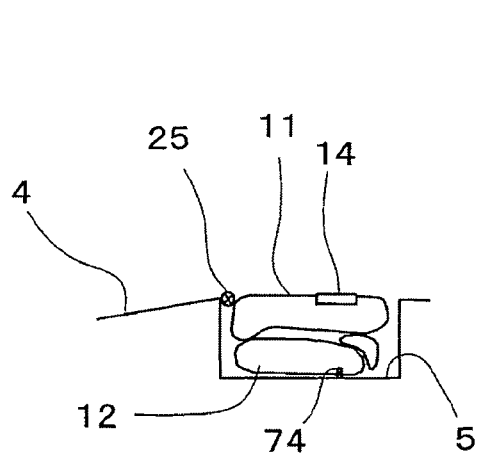
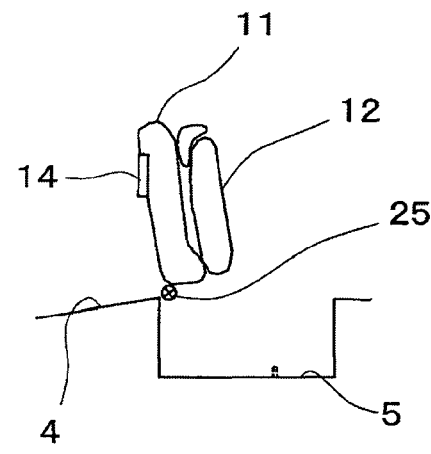
FIG. 14A  FIG. 14B
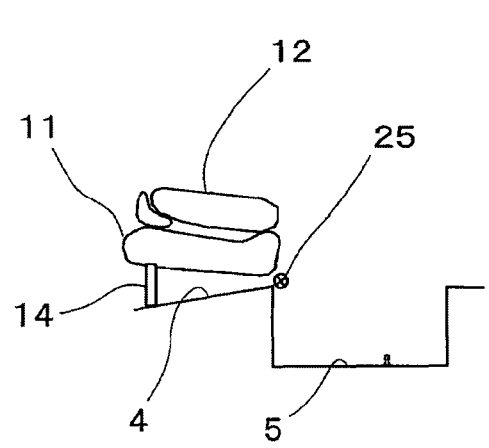
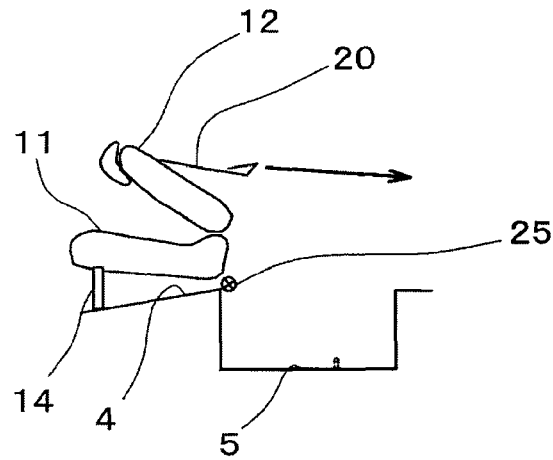
FIG. 14C  FIG. 14D
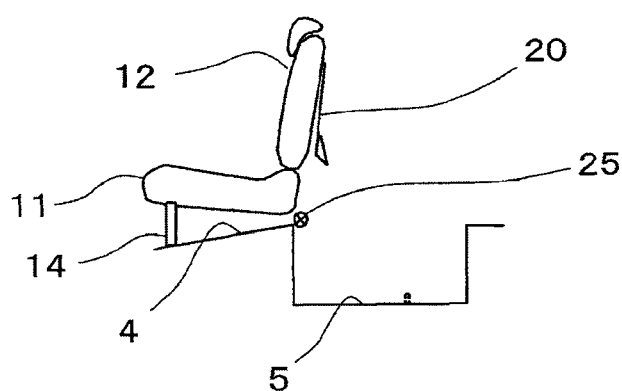
FIG. 14E

SEAT LOCKING DEVICE AND STOWABLE VEHICLE SEAT

CROSS REFERENCE TO RELATED APPLICATIONS

This application is the U.S. national phase of the International Patent Application No. PCT/JP2009/055826, filed Mar. 24, 2009, which claims the benefit of Japanese Patent Application No. 2008-076326, filed Mar. 24, 2008, and the benefit of Japanese Patent Application No. 2008-076328, filed Mar. 24, 2008, the entire contents of both which are incorporated herein by reference.

BACKGROUND

The present invention relates to a seat locking device and a stowable vehicle seat and particularly to a seat locking device and a stowable vehicle seat that locks with the vehicle body floor side during stowing.

A stowable vehicle seat is known, along with an associated technique, that has a rear end portion of a seat cushion constituting a vehicle seat that is supported on the front side of a containing recess portion (stowing recess portion) formed in a vehicle body floor rotatably in the front and rear directions, where the vehicle seat is rotated rearward while a seat back is folded down onto the seat cushion to be stowable in the containing recess portion is known.

That is, as shown in Japanese Unexamined Patent Application Publication No. 2006-082698 ("the '698 Patent Document"), rotating shafts disposed at both right and left sides of the rear end portion of the seat cushion are pivotally supported by brackets disposed at both edge portions on the right and left on the front side of the containing recess portion, and the rear end portion of the seat cushion is rotatably configured in the front-and-rear direction so that the seat is containable in the containing recess portion.

According to the technique described in the '698 Patent Document, since the vehicle seat side contained in the containing recess portion and the vehicle body floor side are not locked to each other, there is a fear that the seat will make noise by rattling when driving the vehicle.

Also, in a stowable vehicle seat in which a coil spring for urging in a direction to install a seat cushion (a returning rotating direction) is attached to the rotating shaft of the seat cushion and the brackets in order to reduce an installation operation load (a returning operation load) to pull the seat up from the stowed state for installation, it is necessary to adjust an urging force within a range so that the seat is not sprung up, and thus, a further reduction in the returning operation load has been difficult.

SUMMARY

In view of the above problems, an object of various embodiments of the present invention is to provide a seat locking device and a stowable vehicle seat that prevents rattling during driving of a stowable vehicle seat in a stowed state and further reduces a returning operation load and improve merchantability and operability of the seat.

The above problems are, according to an embodiment of a seat locking device, solved by a seat locking device that locks and unlocks the stowable vehicle seat side and the vehicle body floor side during stowage of the stowable vehicle seat that is stowable on the vehicle body floor side in a state in which a seat back is folded onto a seat cushion, including a stowage locking member disposed on the stowable vehicle seat side and that is lockable to and unlockable from the vehicle body floor side during stowage of the stowable vehicle seat, a returning operating member disposed on the stowable vehicle seat side and operable in a returning operation of the stowable vehicle seat, a movable member disposed on the stowable vehicle seat side and movable in conjunction with the returning operating member in the returning operation, and a connecting member that connects the stowage locking member and the movable member, in which a lock of the stowage locking member is unlocked/released through the connecting member by movement of the movable member in the returning operation.

As mentioned above, since the stowage locking member that lockable to and unlockable from the vehicle body floor side during stowage of the stowable vehicle seat is disposed on the stowable vehicle seat side, the stowable vehicle seat in the stowed state is lockable to the vehicle body floor side by the stowage locking member, and rattling in the stowed state is prevented. Also, since spring-up of the stowable vehicle seat in the stowed state is prevented, an urging force of a spring or the like for urging in a returning movable direction disposed on the stowable vehicle seat is settable to a large value, and a load for pulling up the stowable vehicle seat (returning operation load) is further reducable.

Also, since the returning operating member operated in the returning operation of the stowable vehicle seat, the movable member that moves in conjunction with the returning operating member in the returning operation, and the connecting member that connects the stowage locking member and the movable member are provided, and the lock of the stowage locking member is released through the connecting member by movement of the movable member in the returning operation, during the returning operation of the stowable vehicle seat, the movable member is moved by the pulling-up operation of the stowable vehicle seat in the stowed state, the lock to the vehicle body floor side is releasable, with improved merchantability and operability of the seat.

At this time, it is preferable that the stowage locking member is movable and urged in a direction for locking to the vehicle body floor side all the time and the movable member moves in a direction opposite to the direction to urge the stowage locking member all the time through the connecting member by an operation of the returning operating member.

With the configuration as above, since the movable member moves in a direction where the movable member urges the stowage locking member all the time, that is, a direction opposite to the direction for locking to the vehicle body floor side by the pulling-up operation of the returning operating member in the returning movable direction, the lock to the vehicle body floor side is releasable at the same time with the pulling-up of the stowable vehicle seat in the returning operation of the stowable vehicle seat, by which favorable operability is obtainable. Also, since the stowage locking member is urged in the direction for locking to the vehicle body floor side all the time, the member is lockable to the vehicle body floor side at a stowage position by the weight of the stowable vehicle seat in the stowing operation.

Also, it is preferable that the stowage locking member is disposed on a rear face side of the seat back, while the returning operating member and the movable member are disposed on a rear face side of the seat cushion.

As mentioned above, by disposing the stowage locking member on the rear face side of the seat back and the returning operating member and the movable member on the rear face side of the seat cushion, the stowable vehicle seat, which is movable rearward and stowed, is lockable to the vehicle body floor side in the stowed state. Also, a seated feeling of a passenger is not affected at all.

At this time, it is preferable that the returning operating member has a gripping portion, and the movable member has an exposed portion partially exposed from the gripping portion, is operable, and is attached to the returning operating member and is moved by a force applied to the exposed portion when the gripping portion is gripped.

With the configuration as above, by gripping the gripping portion by operating the returning operating member during the pulling-up operation of the seat, the movable member is moved at the same time so that the lock of the stowage locking member is releaseable, and the returning operation is facilitated.

Moreover, the device may be so configured that the returning operating member is a flexible member having a predetermined width and the movable member is connected to the returning operating member with the returning operating member locked by the locking portion and is movable by pulling the returning operating member.

With the above configuration, too, by pulling the flexible returning operating member having a predetermined width in the pulling-up operation of the seat, the movable member is moved at the same time, lock of the stowage locking member is unlocked, and operability in the returning operation is improved.

Also, the returning operating member is preferably inserted through both two opening portions disposed on a rear face side of the seat cushion separately and attached.

By inserting and attaching the returning operating member having a predetermined width through the two opening portions disposed on the rear face side of the seat cushion separately, the returning operating member is exposed to the rear face side of the seat cushion so that the pulling-up operation is performable by gripping the exposed returning operating member and the operation in the returning operation is facilitated. Also, since the returning operating member is exposed to the rear face side of the seat back between the two opening portions, the returning operating member is grippable by hand by inserting one's hand into the lower side of the returning operating member from either side of the exposed returning operating member in the width direction, and thus, operability is improved.

The above problems, according to a stowable vehicle seat, are solvable by providing a stowable vehicle seat provided with the features described above.

According to the seat locking device, rattling of the stowable vehicle seat in the stowed state is prevented. Also, since spring-up of the stowable vehicle seat in the stowed state is prevented, an urging force of a spring or the like disposed in the stowable vehicle seat for urging in the returning movable direction is settable to a larger amount, and a load to pull up the stowable vehicle seat (returning operation load) is further reducible.

Moreover, in the returning operation of the stowable vehicle seat, the movable member is moved by the pulling-up operation of the stowable vehicle seat in the stowed state, the lock with the vehicle body floor side is unlockable, and merchantability and operability of the seat is improved.

According to an above-described embodiment of the seat locking device, in the returning operation of the stowable vehicle seat, the lock with the vehicle body floor side is unlockable with the pulling-up of the stowable vehicle seat, while in the stowing operation, the stowable vehicle seat is lockable to the vehicle body floor side at a stowage position by its own weight, and favorable operability is obtained.

According to an above-described embodiment of the seat locking device, the stowable vehicle seat that is moved rearward and stowed is lockable to the vehicle body floor side in the stowed state.

According to an above-described embodiment of the seat locking device, in the pulling-up operation of the seat, the movable member is movable at the same time and the lock of the stowage locking member is unlockable, and the returning operation is facilitated.

According to an above-described embodiment, the seat locking device, since the returning operating member is grippable by inserting one's hand into the lower side of the returning operating member from either side of the exposed returning operating member in the width direction, operability is improved.

BRIEF DESCRIPTION OF THE DRAWINGS

The invention is illustrated in various embodiments illustrated in the following figures and described in more detail below.

FIGS. 12A-E are explanatory side-view diagrams illustrating an operation procedure in a stowing operation of the stowable vehicle seat according to the embodiment of the present invention;

FIGS. 14A-E are explanatory side-view diagrams of an operation procedure in a returning operation of the stowable vehicle seat according to the embodiment of the present invention;

DETAILED DESCRIPTION

An embodiment of the present invention will be described below referring to the attached drawings. Members, arrangement and the like described below do not limit the present invention but it is natural that various variations are possible according to the gist of the present invention.

First, a configuration of a seat S according to this embodiment will be described based on FIGS. 1 to 4.

A vehicle equipped with the seat S according to this embodiment includes three-row seats arranged in series in a longitudinal direction, and seats on the third row are configured stowable. On the rear of the seat S, a stowage recess portion 5 that stows the seat S is disposed on a vehicle body floor 4. A floor carpet, not shown, is folded over substantially the entire surface of the vehicle floor 4.

The seat S has three seats crosswise and is constituted by a right-side seat S1 for two people located on the right side with respect to a traveling direction of the vehicle and a left-side seat S2 for one person.

In the following explanation, the description of right and left side indicating the direction refers to a direction with respect to the traveling direction of the vehicle.

Also, since a containing mechanism and an operating method are the same for both the right-side seat S1 and the left-side seat S2, the right-side seat S1 will be referred to as the seat S collectively in the following explanation example for convenience.

Figure 1:
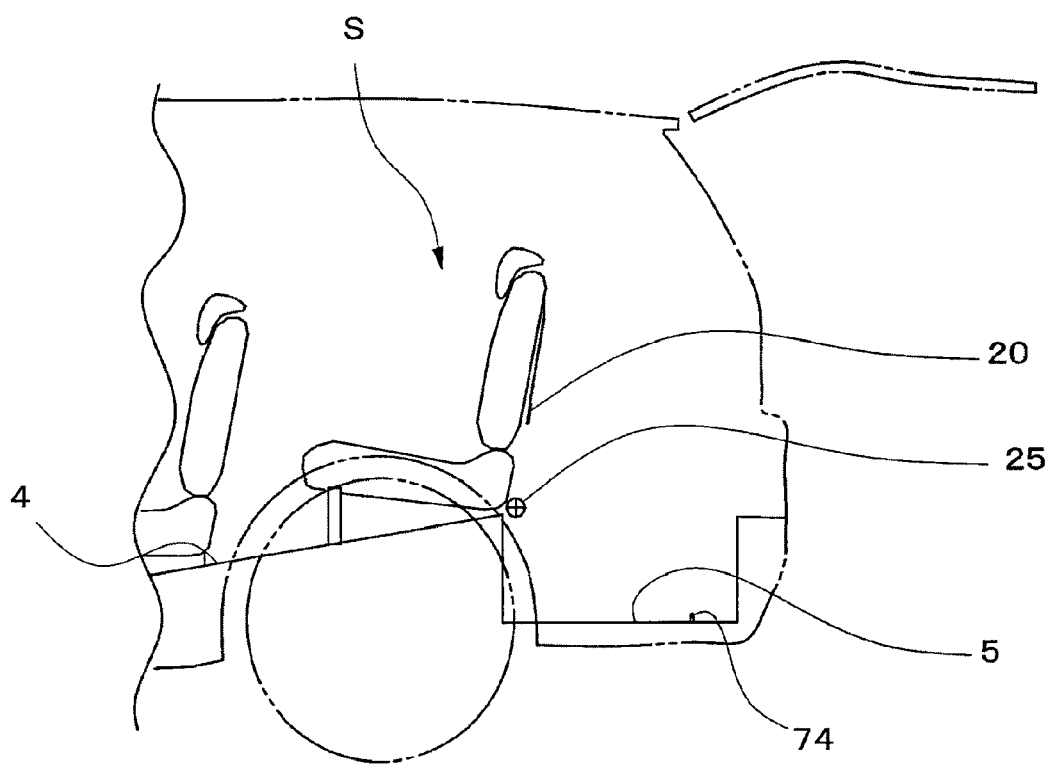
FIG. 1 is a side schematic diagram of a rear portion of a vehicle equipped with a stowable vehicle seat according to an embodiment of the present invention.
Figure 2:
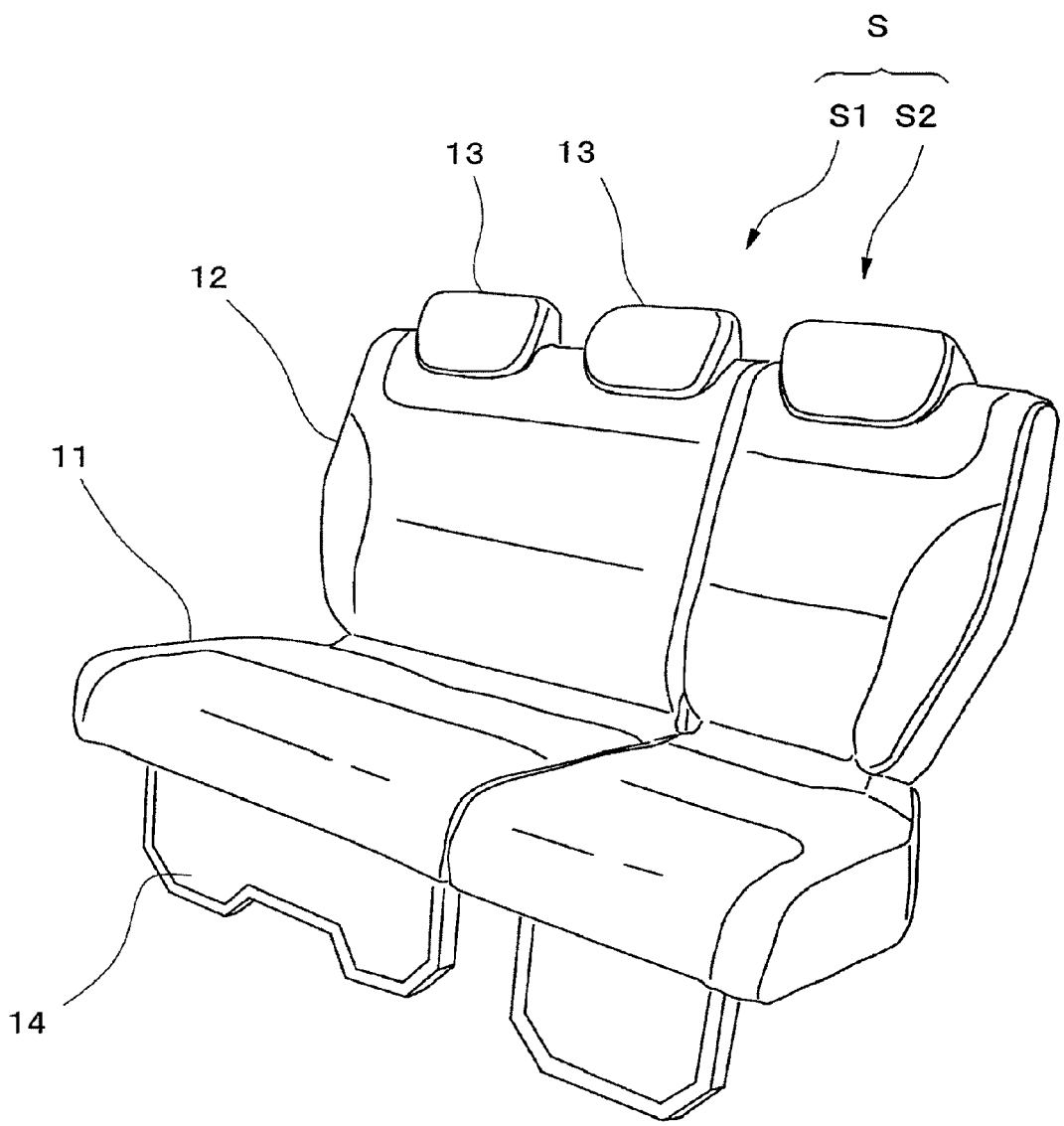
FIG. 2 is a front perspective view of the stowable vehicle seat according to the embodiment of the present invention.
Figure 3:
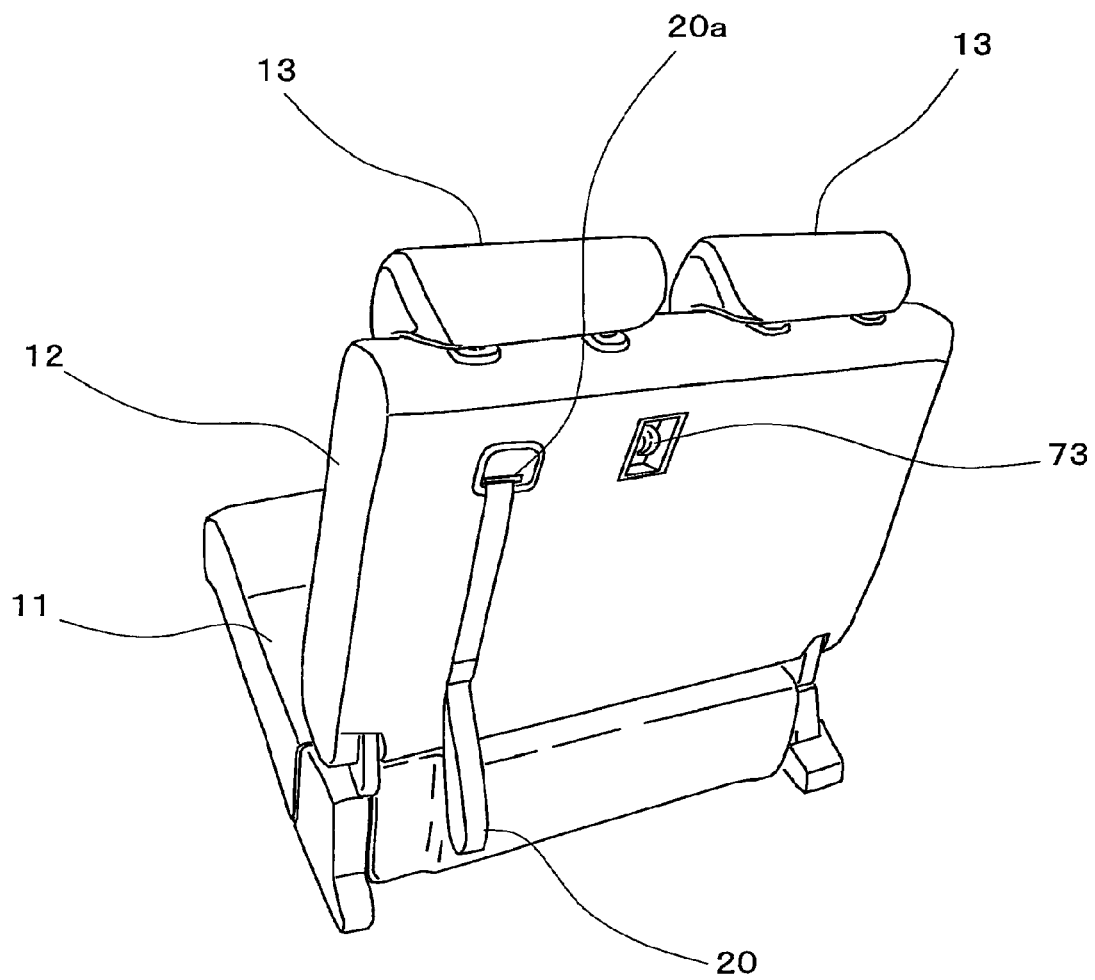
FIG. 3 is a rear perspective view of the stowable vehicle seat according to the embodiment of the present invention.

The seat S includes a seat cushion 11, a seat back 12, head rests 13 and 13, and a front-side leg portion 14. Also, as shown in FIG. 3, a strap 20 as single operating element for performing stowing and returning operations of the seat S extends outward from the rear face side of the seat back 12.

In the seat S according to this embodiment, an operating element of a reclining unlocking mechanism and a leg-portion unlocking mechanism operated when the stowable vehicle seat is stowed and returned are integrated into one as the strap 20.

Figure 10A:
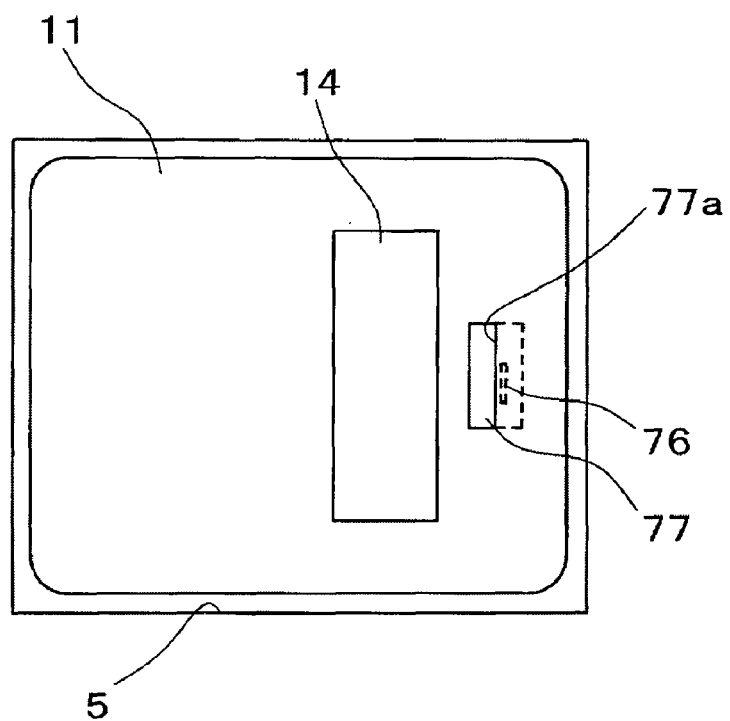
FIGS. 10A-B are top- and side-view explanatory diagrams of a vehicle seat in a stowed state of the stowable vehicle seat according to the embodiment of the present invention.
Figure 10B:
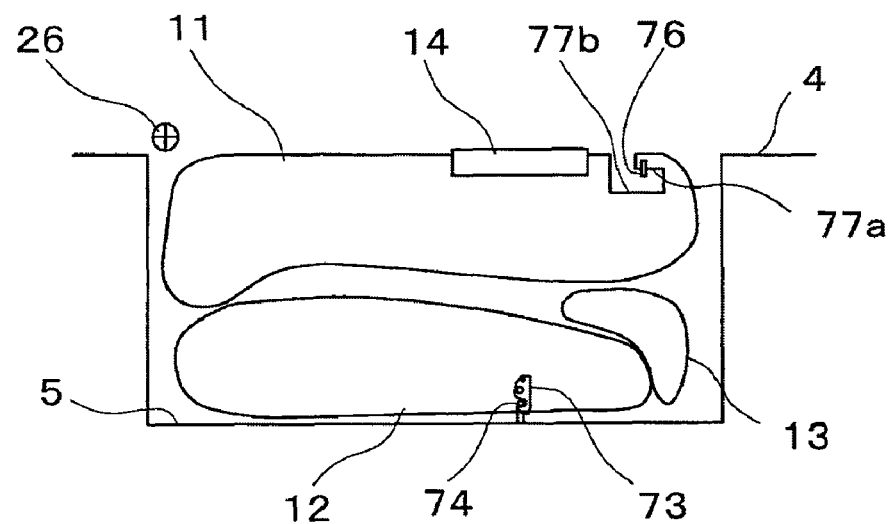

Also, a pulling-up grip 77 as a returning operating member for pulling up the seat S in the stowed state in the returning operation is formed on the rear face side of the seat cushion 11 (See FIG. 10).

The strap 20 is the operating element operated during the stowing and returning operation of the seat S, and a wide bendable belt of a length of approximately 1 m is extended to the rear face side from a strap outlet portion 20a to facilitate the operation by a passenger. Since the stowing operation of the seat S and an upstanding operation of the seat back 12 in the returning operation is performable by a pulling operation of the strap 20, an operation load is reducible as compared with an operation using a lever. In a state in which the stowing and returning operations of the seat S are not performed, a part of the strap 20 is hooked on the rear face of the seat back 12 by a planer fastener. In this embodiment, the strap 20 as the operating element is configured as a belt shape, but it may be formed as a strip shape or a pulling-lever shape.

Figure 4:
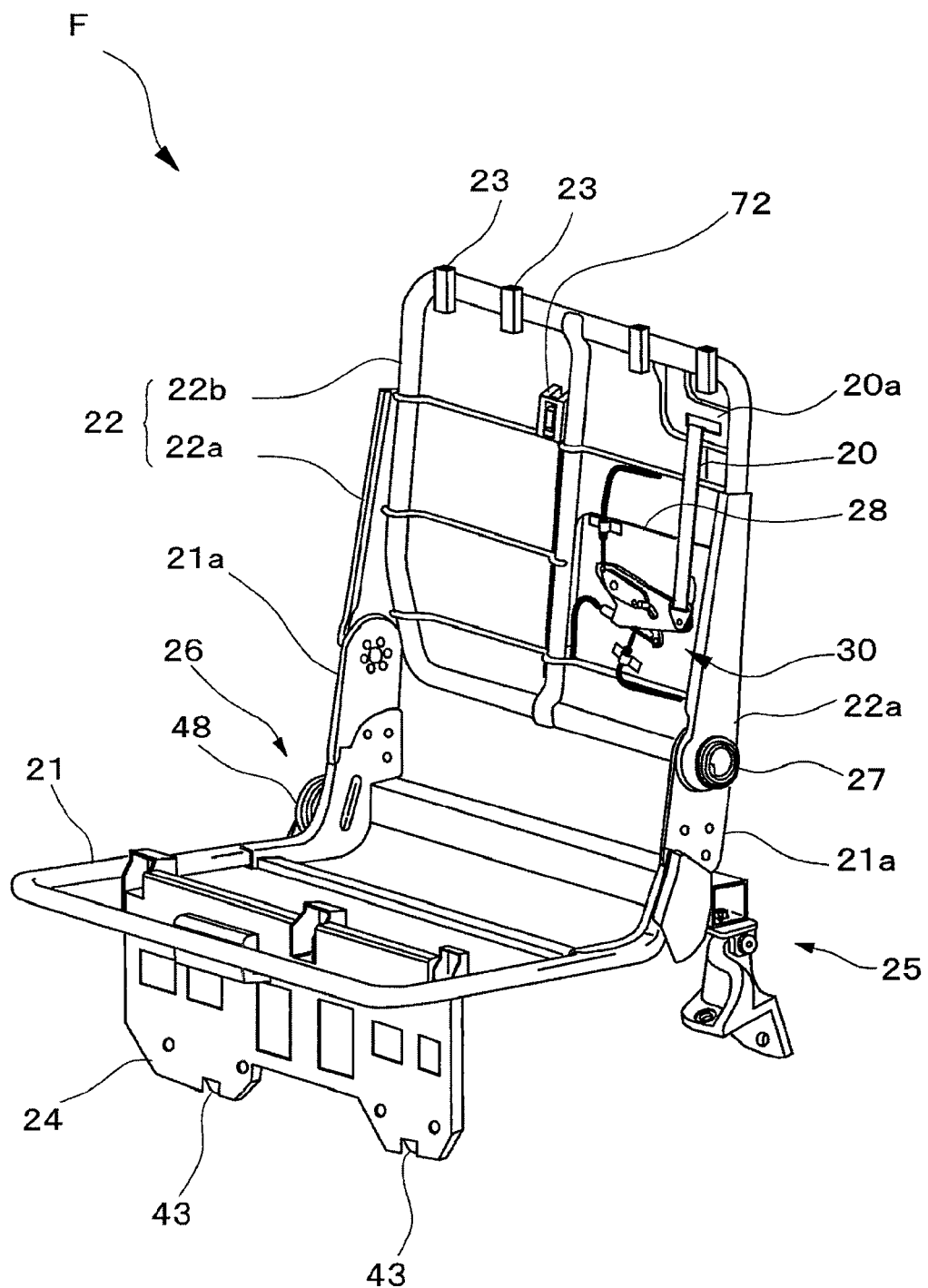
FIG. 4 is an outline front perspective view of a seat frame according to the embodiment of the present invention.
Figure 5:
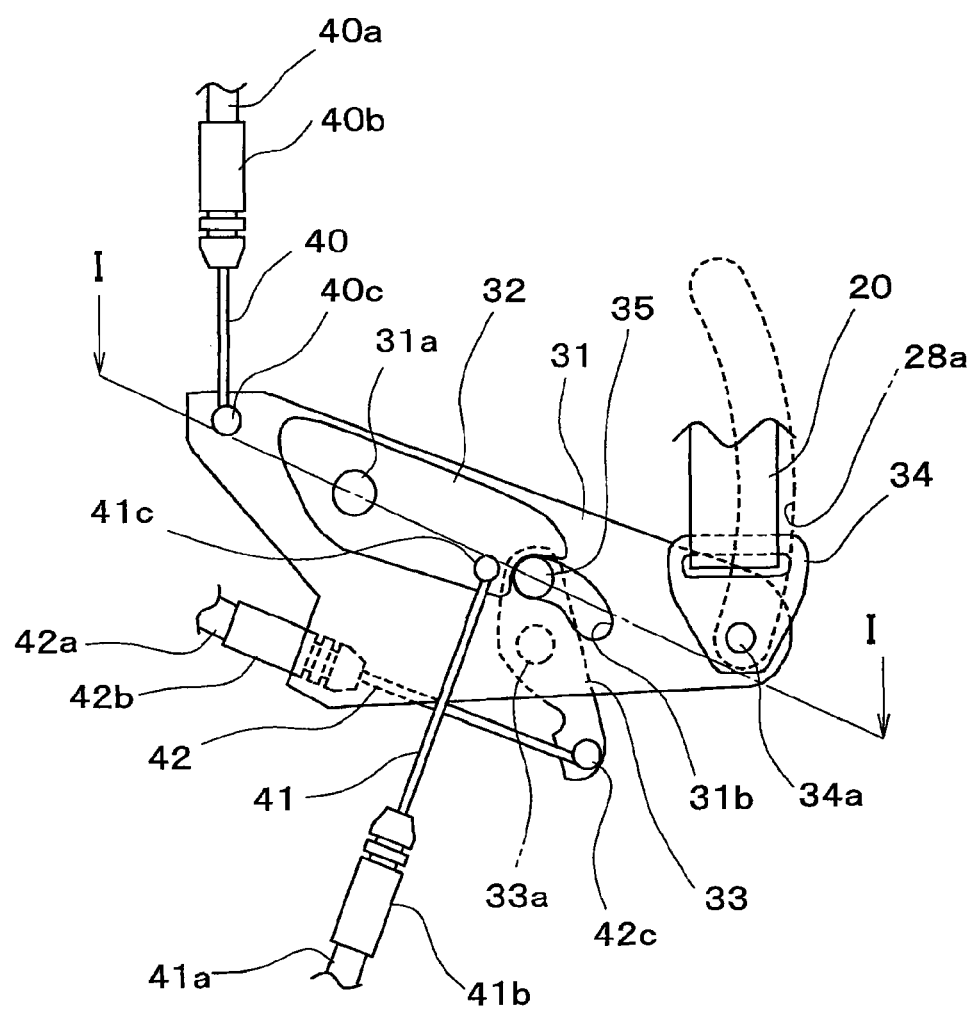
FIG. 5 is an enlarged explanatory side-view diagram of a link mechanism according to the embodiment of the present invention.
Figure 6:
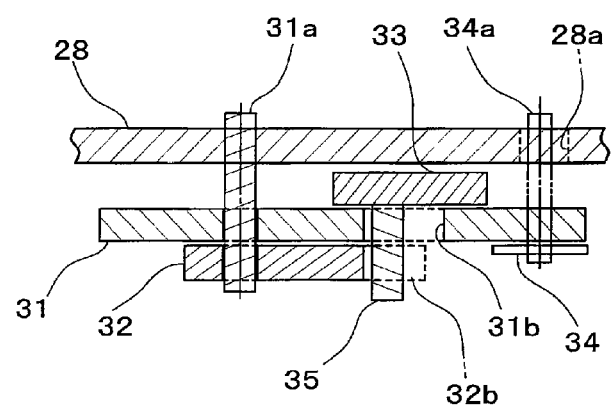
FIG. 6 is a I-I sectional explanatory diagram of the link mechanism according to the embodiment of the present invention.

A seat frame F of the seat S shown in FIG. 4 includes a seat-cushion frame 21 constituting the seat cushion 11, a seat-back frame 22 constituting the seat back 12, and a front-side leg portion frame 24, and the seat-cushion frame 21 and the seat-back frame 22 are connected to each other through a reclining mechanism 27, while the seat-cushion frame 21 and the vehicle body floor 4 side are connected to each other through seat support portions 25 and 26. Also, above the seat-back frame 22, pillars of the head rest frames, not shown, are disposed through pillar support portions 23.

The seat-cushion frame 21 constitutes the seat cushion 11, which is covered by a cushion pad, cover and the like, not shown, and supports the passenger from below. The seat-cushion frame 21 has the front-side leg portion frame 24 rotatably (movably) attached to the front side. Also, at the rear end portion of the seat-cushion frame 21, back frame support portions 21a and 21a that connect to the seat-back frame 22 are disposed.

The rear end portion side of the seat-cushion frame 21 is supported by the seat support portions 25 and 26 rotatably in the front-and-rear direction. A coil spring 48 is attached to the one seat support portion 26 of the right and left seat support portions 25 and 26 to urge the seat cushion 11 in the front rotating (movable) direction all the time.

The seat-back frame 22 constitutes the seat back 12 that is covered by a cushion pad or the like, not shown, and supports the back of a passenger from behind, and in this embodiment, it is formed by a substantially rectangular frame body. In more detail, the seat-back frame 22 includes two side frames 22a and 22a disposed separately in the crosswise direction and extending in the vertical direction and a center frame 22b, which is a substantially rectangular frame body sandwiched by the side frames 22a and 22a.

The lower end portion sides of the side frames 22a and 22a are connected to the back-frame support portions 21a and 21a through the reclining mechanism 27 as a reclining assembly.

Inside the center frame 22b, which is a frame body, a back plate 28 in a substantially plate shape is disposed along the face supporting the back of the passenger, and on the back plate 28, a link mechanism 30, which will be described below, is disposed. Also, the strap outlet portion 20a is disposed on the upper part of the center frame 22b.

Moreover, in the stowed state of the seat S, a support portion 72 of a stowage locking member 73 of the stowage locking mechanism 70 that is lockable with a stowage striker 74 formed in the stowage recess portion 5 is attached to the vicinity of the center of the center frame 22b. The stowage locking mechanism 70 will be described below.

The front-side leg portion frame 24 is covered by a cover material, not shown, to constitute the front-side leg portion 14 and supports the front side of the seat-cushion frame 21 and is connected to the vehicle body floor 4 side. The front-side leg portion frame 24 is supported on the front side of the seat-cushion frame 21 at an upper part rotatably in the front-and-rear direction, and at a lower part of the front-side leg portion frame 24, locking claws 43 and 43 connected to leg-portion strikers 44 disposed on the vehicle body floor 4 side that are lockable and unlockable, are arranged.

Subsequently, a configuration of the link mechanism 30 will be described referring to FIGS. 5 to 9.

The link mechanism 30 is connected to the strap 20 operated in stowing and returning of the seat S and is provided with a function to appropriately cancel rotation of the reclining mechanism 27 and a lock state between the front-side leg portion 14 with the vehicle body floor 4 in conjunction with the operation of the strap 20 and the state of the seat S and is formed on the back plate 28 as mentioned above.

The link mechanism 30 includes a first link member 31, a second link member 32, and a third link member 33 pivotally supported that are rotatable, and a power transmission member is connected to each of the link members. They are operable in conjunction, respectively, according to the state among the power transmission members and the operation among the link members.

As the power transmission member, a reclining release wire 40 is connected to the reclining mechanism 27, a leg-portion release wire 41 connected to the locking claws 43 and 43 of the front-side leg portion 14 (front-side leg portion frame 24), a cancel wire 42 that detects a folded down state (folded state) of the seat back 12, and the strap 20.

The first link member 31 is a substantially inverted triangular member, which is flat in the crosswise direction, and the reclining release wire 40 as a power transmission member and the strap 20 through a strap connecting member 34 are locked to each of locking portions 34a and 40c disposed on both end portion sides. The first link member 31 is rotatably and pivotally supported on the back plate 28 by a first shaft portion 31a as a movable shaft disposed between the locking portions 34a and 40c.

Between the first shaft portion 31a and the locking portion 34a, an arc-shaped long hole 31b is formed to draw a part of a concentric circle around a second shaft portion 33a, which will be described below.

The other end portion sides of the reclining release wire 40 and the strap 20 locked to the first link member 31 will be described below.

Figure 8:
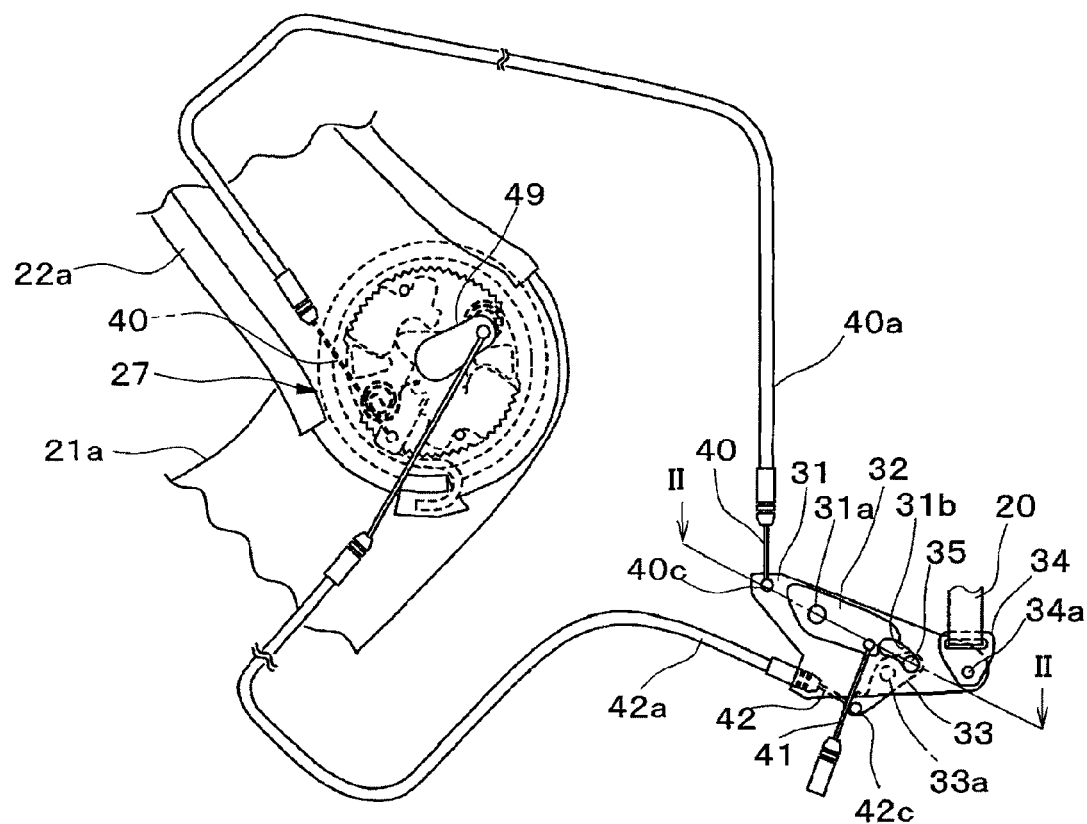
FIG. 8 is an outline explanatory side-view diagram of a link mechanism when a seat back is folded down according to the embodiment of the present invention.
Figure 9:
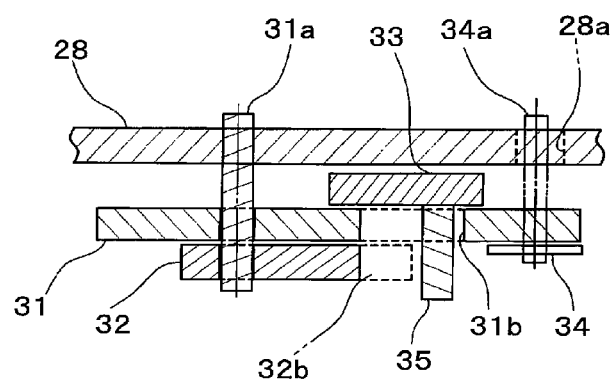
FIG. 9 is a II-II sectional explanatory diagram of the link mechanism according to the embodiment of the present invention.

As shown in FIG. 8, the other end portion side of the reclining release wire 40 locked to the locking portion 40c on the end portion side of the first link member 31 is guided by a reclining release cable 40a and connected to the reclining mechanism 27 as the reclining assembly that performs a locking and unlocking operation of reclining of the seat back 12.

The reclining mechanism 27 unlocks the lock state of the reclining mechanism 27 if the reclining release wire 40 is pulled by an operation of the link mechanism 30 toward the link mechanism 30 side to make a reclining adjustment of the seat back 12.

The other end portion side of the strap 20 connected to the first link member 31 through the strap connecting member 34 is extended outward of the seat back 12 from the strap outlet portion 20a disposed on the rear face of the seat back 12 to facilitate the operation by the passenger. Power (via an operating force by the passenger) is transmittable to the first link member 31 in conjunction with the passenger's operation of the strap 20.

That is, if the strap 20 is pulled and operated, the first link member 31 is rotated, and lock of the reclining mechanism 27 is unlocked.

The second link member 32 is a substantially rectangular member and is arranged on the first link member 31. The second link member 32 is rotatably and pivotally supported at one end portion side by the first shaft portion 31a coaxially with the first link member 31, and a locking recess portion 32b brought into contact with a locking projection 35, which will be described below, is formed on the other end portion side. Between the first shaft portion 31a and the locking recess portion 32b, a locking portion 41c, to which the leg-portion release wire 41 is locked, is formed.

The other end portion side of the leg-portion release wire 41 locked by the second link member 32 will be described below.

Figure 7:
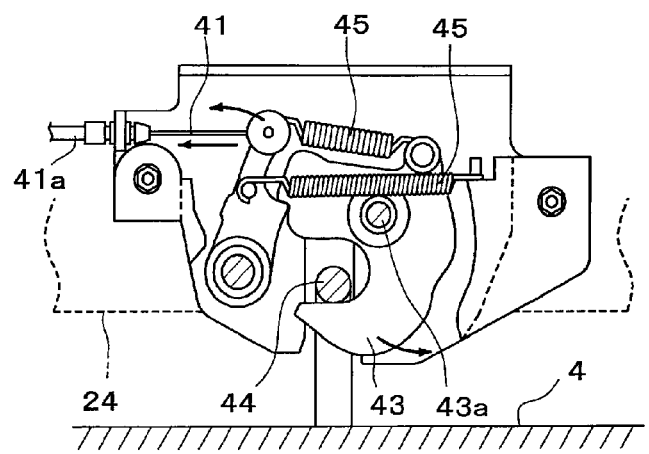
FIG. 7 is an outline explanatory side-view diagram of a locking portion of a front-side leg portion according to the embodiment of the present invention.

As shown in FIG. 7, the other end portion side of the leg-portion release wire 41 locked to the locking portion 41c of the second link member 32 is guided by a leg-portion release cable 41a and connected to a leg-portion unlocking mechanism. The leg-portion unlocking mechanism is formed within the front-side leg portion 14, and if the leg-portion release wire 41 is pulled by the operation of the link mechanism 30 toward the link mechanism 30 side, the locking claw 43 connected to the leg-portion release wire 41 is rotated around a rotating shaft 43a, lock with the leg-portion striker 44 on the vehicle body floor 4 side is unlocked, and the seat cushion 11 is brought into a rotatable state in the front-and-rear direction.

The locking claw 43 is urged by an urging spring 45 all the time for rotation in a direction where the lock state to the leg-portion striker 44 is maintained.

The third link member 33 is a substantially rectangular member, arranged between the first link member 31 and the back plate 28, and has the center part pivotally supported by the second shaft portion 33a rotabably to the first link member 31 side.

At the lower end portion side of the third link member 33, a cancel wire 42 is locked through a locking portion 42c.

At the upper end portion side, the cylindrical locking projection 35 as a locking portion is formed, and this locking projection 35 is inserted through the arc-shaped long hole 31b formed in the first link member 31 and brought into contact with the locking recess portion 32b of the second link member 32 so that the second link member 32 is locked to be rotated along with the first link member 31. Here, since the locking projection 35 is formed having an outer diameter slightly smaller than a width of the long hole 31b, while the long hole 31b is formed in an arcuate shape to draw a part of a concentric circle of the second shaft portion 33a as mentioned above, it is so configured that the locking projection 35 is moved along the long hole 31b along with the rotation of the third link member 33. Upper and lower limits in a rotation amount of the third link member 33 are adjusted by the length of the long hole 31b.

The other end portion side of the cancel wire 42 locked by the third link member 33 will be described below.

As shown in FIG. 8, the other end portion side of the cancel wire 42 locked by the locking portion 42c of the third link member 33 is guided by a cancel cable 42a and connected to a locking rib 49 formed on a connection portion between the side frame 22a and the back-frame support portion 21a. The locking rib 49 is a member disposed on the reclining mechanism 27 and mounted to rotate with the side frame 22a. That is, it is so configured in this embodiment that the other end portion of the cancel wire 42 is locked to this locking rib 49, and the locking rib 49 pulls the locking portion 42c formed on the third link member 33 through the cancel wire 42 while the seat back 12 is folded down.

In this embodiment, the locking rib 49 locked to the other end portion side of the cancel wire 42 is formed on the reclining mechanism 27, but the rib may be formed at other lock positions as long as it is configured such that the cancel wire 42 is operated in a state in which the seat back 12 is folded down with respect to the seat cushion 11. Moreover, it may also be formed at a position away from the reclining mechanism 27.

While the third link member 33 is not rotated, the second link member 32 is locked to the first link member 31 by the locking projection 35 and rotated with the rotation of the first link member 31 and pulls the leg-portion release wire 41.

If the third link member 33 is rotated, the locking projection 35 secured to the third link member 33 is moved along the long hole 31b. Since it is no longer in contact with the locking projection 35 at the locking recess portion 32b due to the movement of the locking projection 35, the lock of the rotation between the first link member 31 and the second link member 32 is unlocked.

At this time, by way of the operation of the strap 20, the second link member 32 is not rotated even if the first link member 31 is rotated, and the leg-portion release wire 41 locked by the second link member 32 is no longer pulled even if the first link member 31 is rotated.

That is, in the state in which the seat back 12 is folded down, it is so configured that the lock between the front-side leg portion 14 and the vehicle body floor 4 is not unlocked even if the strap 20 is pulled.

On the reclining release wire 40 and the leg-portion release wire 41 on the other end portion side of the link mechanism 30, an urging spring, not shown, is disposed to urge the reclining release wire 40 and the leg-portion release wire 41 in a direction to hold the lock state all the time. Thus, in a state in which the passenger is not operating the strap 20, with regard to the first link member 31 and the second link member 32, too, the rotation of the link mechanism 30 is urged in a direction to pull the strap 20 downward all the time through the strap connecting member 34.

The locking portion 34a of the strap connecting member 34 disposed on the first link member 31 pivotally supports the strap connecting member 34 rotatably on the first link member 31 and the other end side thereof is inserted through a guiding hole portion 28a formed in the back plate 28. Since the guiding hole portion 28a is formed in an arcuate shape to draw a part of a concentric circle of the first shaft portion 31a, the locking portion 34a is movable within the guiding hole portion 28a with rotation of the first link member 31. Also, by adjusting the length of the guiding hole portion 28a, it is possible to set upper and lower limits of a rotation amount of the first link member 31.

For the second link member 32, too, an irregular-shaped stopper, not shown, is disposed on the back plate 28 or on the first link member 31 to arbitrarily set the upper and lower limits of the rotation amount.

End-portion members 40b and 41b, which are end portions on the link mechanism 30 side of the reclining release cable 40a and the leg-portion release cable 41a for guiding the reclining release wire 40 and the leg-portion release wire 41, respectively, are secured onto the back plate 28 by a locking member, not shown.

An end-portion member 42b, which is an end portion on the link mechanism 30 side of the cancel cable 42a for guiding the cancel wire 42 is secured to the first link member 31 by a locking member, not shown.

Figure 11A:
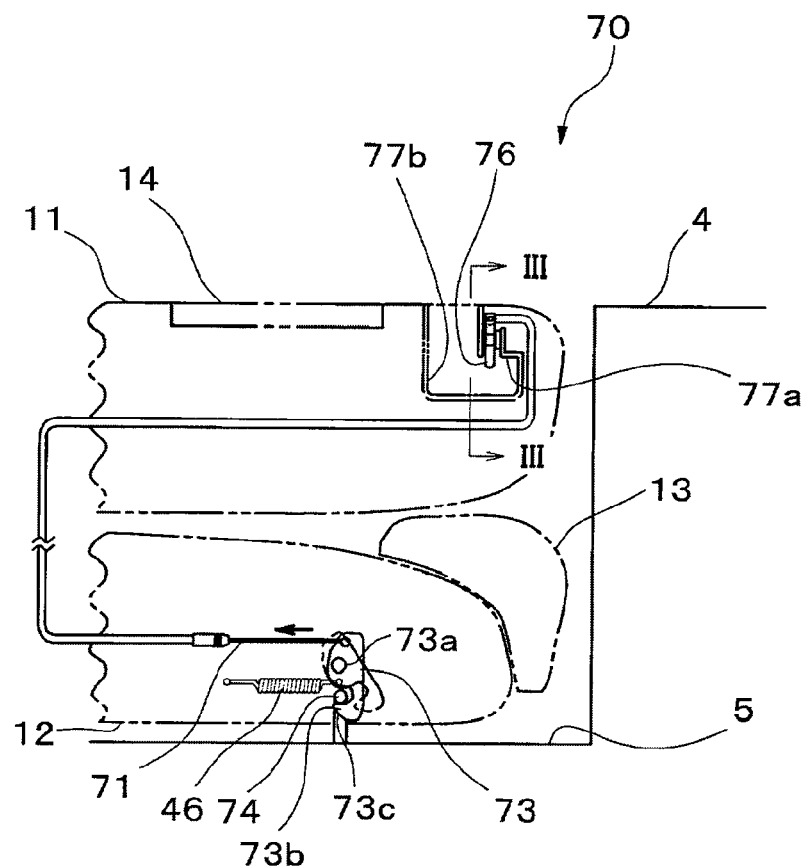
FIGS. 11A-B are outline explanatory side-view diagrams of a stowage locking mechanism according to the embodiment of the present invention.
Figure 11B:
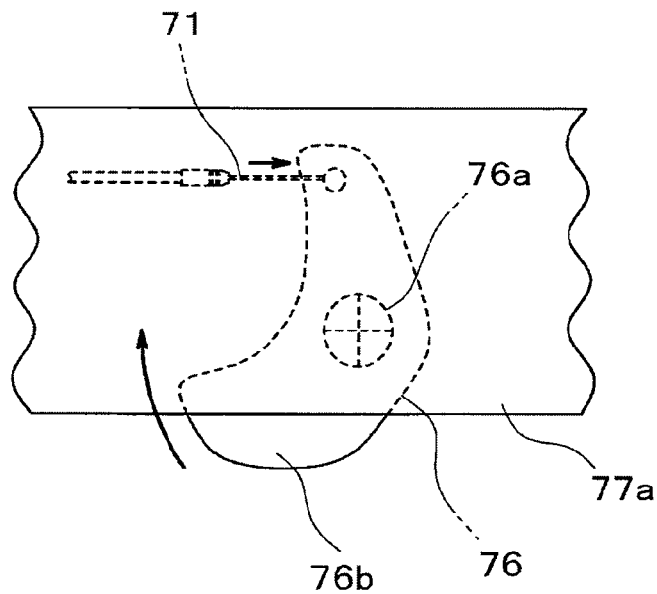

Here, a stowage locking mechanism 70 will be described referring to FIGS. 10 and 11.

The stowage locking mechanism 70 is a locking mechanism to hold the seat S in the state stowed in the stowage recess portion 5 and includes the stowage striker 74 disposed on the bottom part of the stowage recess portion 5, the stowage locking member 73 disposed on the rear face side of the seat back 12, an urging spring 46 that urges to the side holding the lock of the stowage locking member 73 all the time, the pulling-up grip 77 attached to the rear face side of the seat cushion 11, a movable member 76 attached to the pulling-up grip 77, and a stowage unlocking wire 71 connected to the stowage locking member 73 and the movable member 76, as a connecting member for operating the stowage locking member 73. The stowage locking member 73 and the urging spring 46 are attached to the rear face side of the seat back frame 22.

The seat locking device of this embodiment includes at least the stowage unlocking wire 71 of the stowage locking mechanism 70, the stowage locking member 73, the movable member 76, and the puling-up grip 77.

The stowage locking member 73 is rotatably (movably) supported by a rotating shaft 73a by the support portion 72 (See FIG. 4) attached to the seat-back frame 22, and on the striker 74 side from the rotating shaft 73a, a claw-shaped locking claw 73b, which is lockable to and unlockable from the striker 74 by rotation (movement), is formed. This stowage locking member 73 is urged by the urging spring 46 all the time in a direction lockable to the stowage striker 74, and by pulling the stowage unlocking wire 71 through an operation of the pulling-up grip 77, which will be described below, the member is rotated in a direction opposite to the urging direction of the urging spring 46, and the lock with the stowage striker 74 is unlocked.

The puling-up grip 77 is a portion that is gripped when the seat S in the stowed state is pulled up and is configured by a gripping portion 77a formed in a shape, which extends into a dent formed in the rear face of the seat cushion 11 in the stowed state to be easily gripped, and an edge portion 77b covering the dent.

The movable member 76 is attached to the gripping portion 77a of the pulling-up grip 77 rotatably (movably) by a rotating shaft 76a in the pulling-up direction. The lower part of the movable member 76 is extended downward from the gripping portion 77a of the pulling-up grip 77 and partially exposed, and this extended exposed portion 76b is configured with a size that is touched by a passenger without fail if the pulling-up grip 77 is gripped. Thus, it is configured so that if the passenger grips the pulling-up grip 77 and tries to pull it up in the returning rotation (movable) direction when returning the seat S in the stowed state, the movable member 76 is rotated (moved) and operated. As mentioned above, the movable member 76 is disposed to be rotated (moved) in conjunction with the operation of the pulling-up grip 77, which is a returning operating member. To move in conjunction is supposed to include interlocking movement by an operation as in this embodiment.

Also, a portion of the movable member 76 touched by the hand in the operation of the pulling-up grip 77 is worked smoothly in order to prevent injury.

In a stowage operation of the seat S, the rear face side of the seat back 12 is pushed onto the stowage recess portion 5 by the own weight of the seat S, and the stowage locking member 73 is locked by the stowage striker 74. That is because if an inclination portion 73c formed on the rear face side of the locking portion of the locking claw 73b touches the stowage striker 74, the stowage locking member 73 is rotated around the rotating shaft 73a to a position lockable with the stowage striker 74.

In a returning operation of the seat S from the stowed state, by gripping and pulling the gripping portion 77a of the pulling-up grip 77 in the returning rotating direction, the movable member 76 rotatably attached to the gripping portion 77a of the pulling-up grip 77 is rotated in a direction to pull the stowage unlocking wire 71. Then, since the stowage unlocking wire 71 is pulled, the stowage locking member 73 is rotated in the unlocking direction, the locking claw 73b is disengaged from the stowage striker 74, and the lock between the stowage recess portion 5 and the seat back 12 is unlocked. The returning operation of the seat S is performable by continuously pulling up the pulling-up grip 77 after that.

As mentioned above, since the seat S is pulled up after the lock between the vehicle body floor 4 side and the seat back 12 is unlocked, sliding resistance between the stowage locking member 73 and the stowage striker 74 is not increased.

By locking the seat S in the stowed state to the stowage striker 74, rattling of the seat S in the stowed state during driving of the vehicle is prevented. Also, since spring-up of the seat S in the stowed state is prevented, the urging force of the coil spring 48 attached to the seat support portion 26 is improved, and an operation load is further reducible.

Since it is so configured that the movable member 76 and the pulling-up grip 77 are disposed on the rear face side of the seat cushion 11 and the stowage locking member 73 on the rear face side of the seat back 12, respectively, passenger's seated feeling is not affected. Also, since the rear face sides of the seat cushion 11 and the seat back 12 are closer in a distance to the seat frame F (the seat-cushion frame 21, the seat-back frame 22) than the distances from the seated face sides, a mechanism with high durability is easily obtained by attaching members such as the movable member 76, the pulling-up grip 77, the stowage locking member 73 and the like on the seat frame F. Moreover, when a cover member made of resin is attached to the rear face sides of the seat cushion 11 and the seat back 12, durability and designability is improved by configuring such that a part of the members such as the movable member 76, the pulling-up grip 77, the stowage locking member 73 and the like continues to the cover member made of resin.

Subsequently, the stowing and the returning operations of the seat S and the operation of the link mechanism 30 according to this embodiment will be described referring to FIGS. 12 to 15.

First, the stowing operation of the seat S will be described according to FIG. 12.

FIG. 12A shows a state in which the strap 20 is pulled rearward in a seat installation state. When the strap 20 is pulled rearward by a passenger, the lock of the reclining mechanism 27 is unlocked.

At this time, the seat back 12 to which the strap 20 is attached is urged to the forward direction by a coil spring, not shown, attached to the reclining mechanism 27. If the strap 20 is pulled against the urging direction, the lock of the locking claw 43 of the front-side leg portion 14 is unlocked by a stress lower than a stress to fold the seat back 12 down rearward.

FIG. 12B shows a state in which the lock of the locking claw 43 of the front-side leg portion 14 is unlocked. That is, the lock of the locking claw 43 of the front-side leg portion 14 is unlocked, and the seat S is made rotatable rearward.

FIGS. 12C and 12D show a state in which the rearward rotation of the seat S is progressed. The center of gravity of the seat S exceeds a middle point of rotation and thereafter, the seat S is rotated rearward by its own weight and reaches the stowed state. At this time, a rearward rotating speed of the seat S is reduced by the coil spring 48 attached to the seat support portion 26 to alleviate an impact generated during the stowage into the stowage recess portion 5.

The front-side leg portion 14 is folded to the seat cushion 11 side by its own weight along with the rotation of the seat S.

FIG. 12E shows a stowed state of the seat S, which is a state in which the stowage striker 74 disposed on the bottom part of the stowage recess portion 5 and the stowage locking member 73 disposed on the rear face of the seat back 12 are locked by the stowage locking mechanism 70. The stowage locking mechanism 70 is locked by pressing the stowage locking member 73 onto the stowage striker 74 by the weight of the seat S. In this state, an opening portion of the stowage recess portion 5 forms an integral flat surface with the rear face of the seat cushion 11, and a large trunk is ensured.

An operation of the link mechanism during the stowing operation of the above-mentioned seat S will be described according to FIG. 13.

Figure 13C:
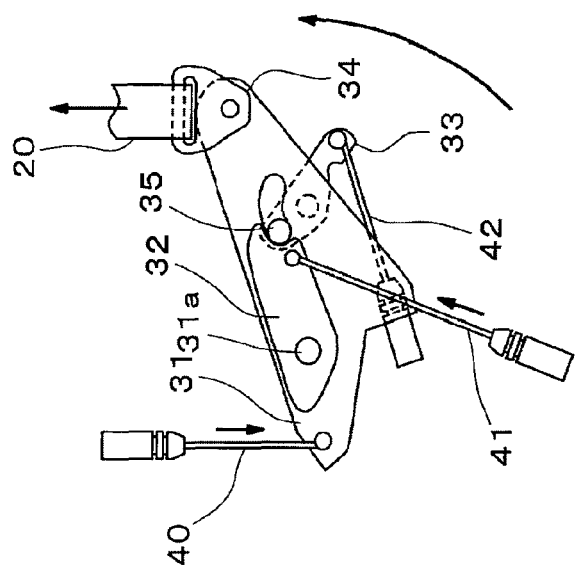
FIGS. 13A-C are operation explanatory side-view diagrams of the link mechanism in the stowing operation of the stowable vehicle seat according to the embodiment of the present invention.
Figure 13B:
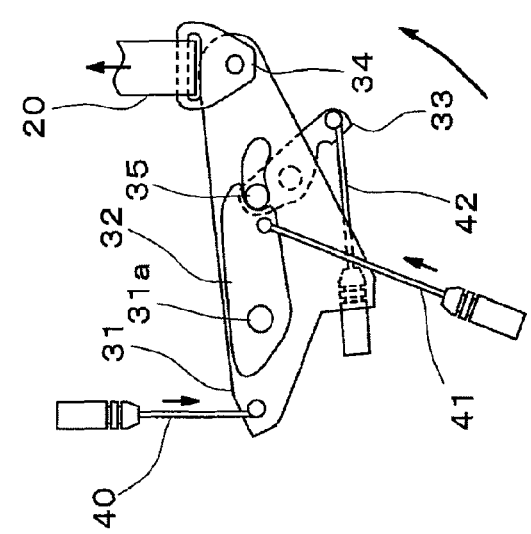
Figure 13A:
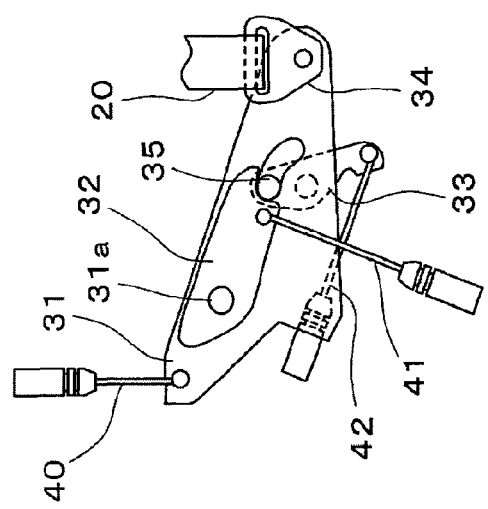

FIG. 13A shows a state of the link mechanism 30 in the installed state of the seat S (See FIG. 12A), which is a stage prior to the operation of the strap 20 by the passenger. The state of the link mechanism 30 at this time is referred to as an original position.

FIG. 13B shows a state of the link mechanism 30 when the lock of the reclining mechanism 27 is unlocked (FIG. 12B), which is a stage when the strap 20 is somewhat pulled rearward. Since the first link member 31 is rotated in the direction pulled by the operation of the strap 20, the reclining release wire 40 is pulled with the rotation, and the lock of the reclining mechanism 27 is unlocked. At this time, since the seat back 12 is in the upstanding state with respect to the seat cushion 11, the cancel wire 42 is not pulled, the second link member 32 is rotated along with the first link member 31, and the leg-portion release wire 41 is also pulled. However, the lock by the locking claw 43 connecting the front-side leg portion 14 and the vehicle body floor 4 side is set to not be unlocked by the pulled amount in this state, and the lock of the leg portion is maintained.

FIG. 13C shows a state (FIGS. 12C and 12D) of the link mechanism 30 when the lock between the reclining mechanism 27 and the locking claw 43 of the front-side leg portion 14 is unlocked and a state in which the strap 20 is further pulled. By pulling the strap 20 more strongly than the state (FIG. 12B) in FIG. 13B, the first link member 31 is also rotated largely. The reclining release wire 40 and the leg-portion release wire 41 are further pulled along with this rotation. At this time, the lock of the leg portion is unlocked.

By stopping the operation of the strap 20 after the seat S has been stowed, the link mechanism 30 is returned to the state in FIG. 13A by the urging spring, not shown, attached to the unlocking mechanism side (the other end portion side of the link mechanism 30) to which the reclining release wire 40 and the leg-portion release wire 41 are connected, respectively. However, since the seat back 12 is stowed in the state (FIG. 12E) in which it is folded down with respect to the seat cushion 11, the cancel wire 42 is pulled and the third link member 33 is held in the rotated state.

Subsequently, the returning operation of the seat S will be described according to FIG. 14.

FIG. 14A shows a state in which the seat S is locked by the stowage locking mechanism 70 and stowed. By pulling the pulling-up grip 77 in this stowed state, the lock between the stowage locking member 73 and the stowage striker 74 formed on the vehicle body floor 4 is unlocked as mentioned above. As the returning operation, by continuously pulling the pulling-up grip 77, the seat S is rotatable in the returning rotating direction.

FIG. 14B shows a state of the forward rotation of the seat S, and due to urging by the coil spring 48 attached to the seat support portion 26 in the returning rotating direction, the operation load is reduced.

Along with the forward rotation of the seat S, the front-side leg portion 14 is extended below by its own weight.

FIG. 14C shows a state in which the locking claw 43 of the front-side leg portion 14 of the seat S is locked to the vehicle body floor 4 side. The locking claw 43 is locked to the leg-portion striker 44 on the vehicle body floor 4 side by a pressure of the weight of the seat S.

FIG. 14D shows an operation to pull the strap 20 rearward from the state in which the locking claw 43 of the front-side leg portion 14 of the seat S is locked to the leg-portion striker 44 on the vehicle body floor 4 side.

FIG. 14E shows a state in which the returning operation of the seat S is completed.

That is, the passenger returns the seat S only through the operation to pull the strap 20 rearward after pulling up the pulling-up grip 77 of the seat S in the stowed state and rotating it forward with the seat back 12 folded down.

The operation of the link mechanism 30 during the above-mentioned returning operation of the seat S will be described according to FIGS. 14 and 15.

Figures 15A, 15B, 15C:
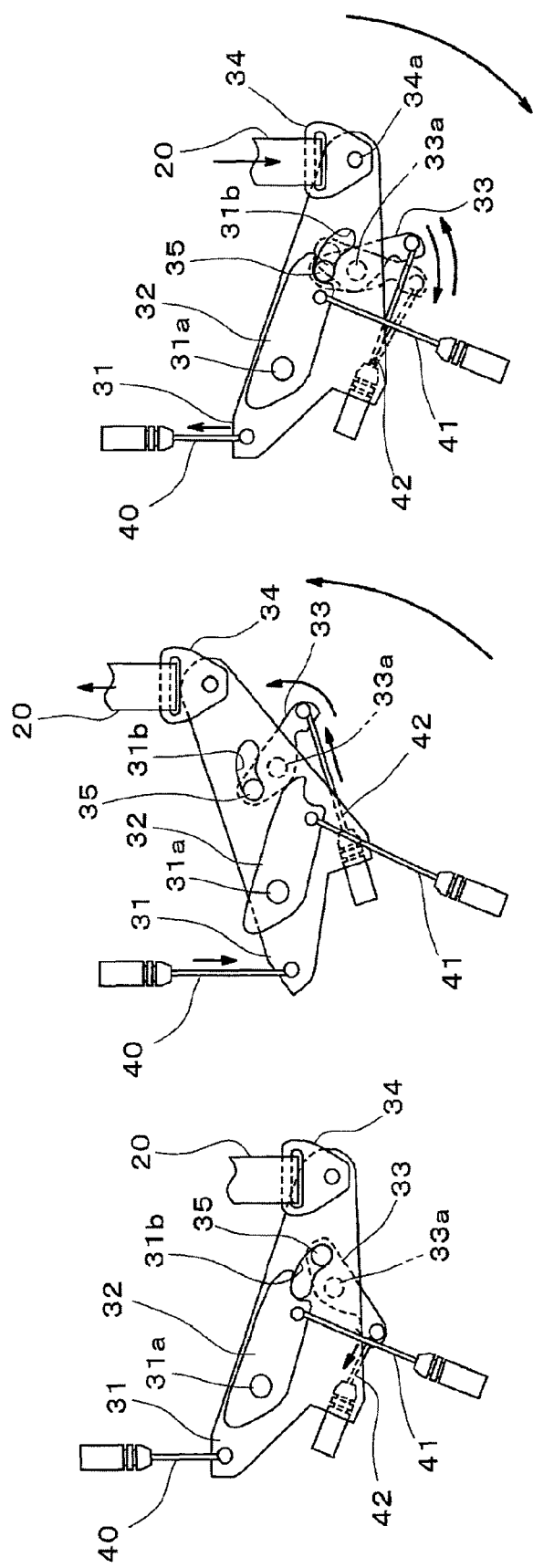
FIGS. 15A-C are operation explanatory side-view diagrams of the link mechanism in the returning operation of the stowable vehicle seat according to the embodiment of the present invention.

FIG. 15A shows a state of the link mechanism 30 from the stowed state (FIG. 14A) of the seat S to a stage (FIG. 14C) in which the seat S is rotated and the locking claw 43 is locked to the vehicle body floor 4 side. This is the state before the strap 20 is operated by the passenger, and since the operation is being performed in the state in which the seat back 12 is folded down or at a neutral position of urging, the cancel wire 42 is pulled, and the third link member 33 is held in the rotated state.

FIG. 15B shows a stage (FIG. 14D) in which the strap 20 is somewhat pulled rearward in order to stand the seat back 12. By way of the operation of the strap 20, the first link member 31 is rotated. With this rotation, the reclining release wire 40 is pulled, the lock of the reclining mechanism 27 is unlocked, and the rearward rotation of the seat back 12 is made possible. At this time, since the locking projection 35 is moved together with the third link member 33, the second link member 32 is kept in a state not locked to the first link member 31 and cannot be rotated even if the first link member 31 is rotated.

Also, with standing of the seat back 12, the rotation amount of the third link member 33 is reduced, but since it is rotated exceeding a rotating range in which the locking projection 35 is brought into contact with the second link member 32, a state in which the locking recess portion 32b of the second link member 32 is not locked by the first link member 31 is maintained. Thus, a state in which the lock of the locking claw 43 connecting the front-side leg portion 14 and the vehicle body floor 4 side is not unlocked is maintained, and the seat back 12 is made to stand with respect to the seat cushion 11 only by the operation to pull the strap 20.

FIG. 15C shows a state (FIG. 14E) in which the returning operation of the seat S is completed. By stopping the rearward pulling operation of the strap 20, the position of the first link member 31 is returned to the original position by urging from the reclining release wire 40 and the leg-portion release wire 41. At this time, since the seat back 12 is made to raise with respect to the seat cushion 11, the third link member 33 is in a state not pulled by the cancel wire 42. Thus, the third link member 33 is rotatable even with a slight stress, the second link member 32 is also returned to the original position and locked by the first link member 31, and each link member of the link mechanism 30 is returned to the state of the original position.

Figure 16A:
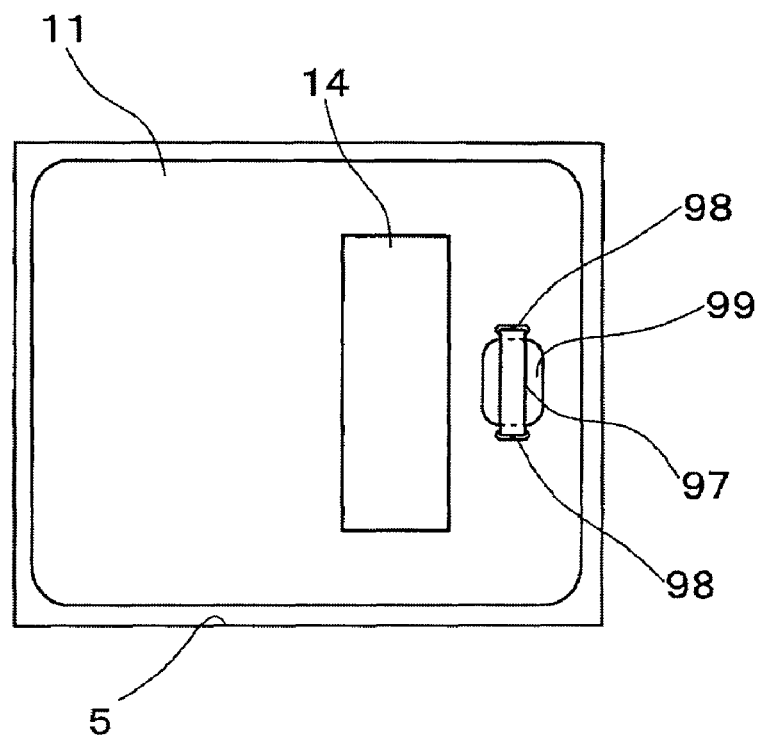
FIGS. 16A-B are top- and side-view explanatory diagrams of a vehicle seat in the stowed state of the stowable vehicle seat according to another embodiment of the present invention.
Figure 16B:
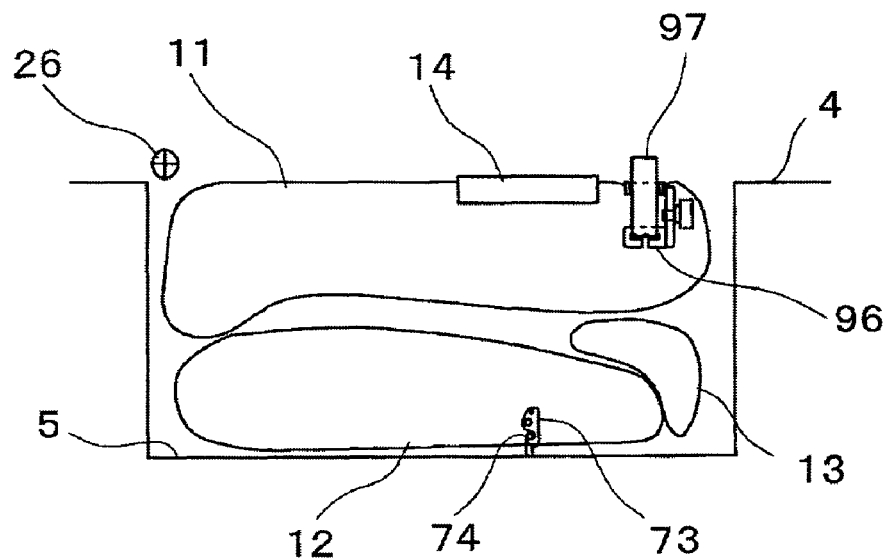
Figure 17A:
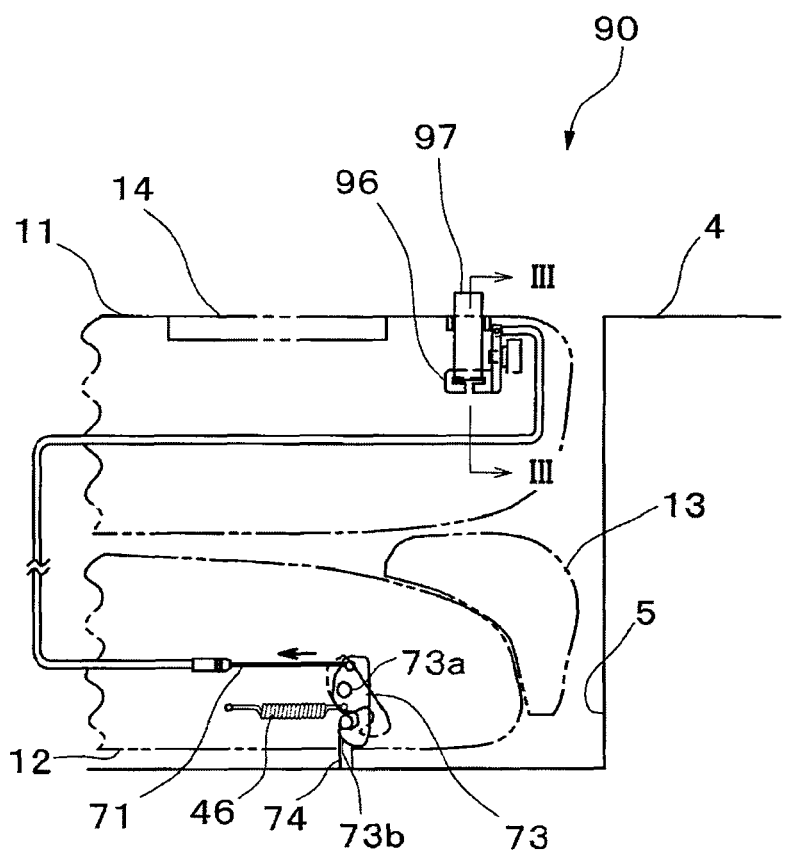
FIGS. 17A-B are outline explanatory side-view diagram of a stowage locking mechanism according to another embodiment of the present invention.
Figure 17B:
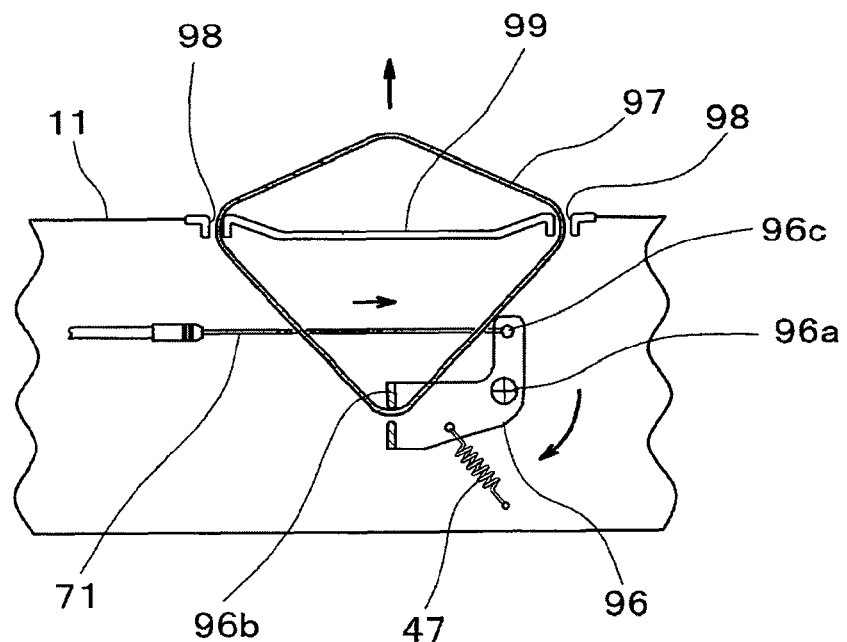

Subsequently, another embodiment of the present invention will be described referring to FIGS. 16 and 17. FIG. 16 are upper and side explanatory diagrams of a vehicle seat in a stowed state of the stowable vehicle seat, and FIG. 17 are outline explanatory diagrams of a stowage locking mechanism.

In the following embodiment, the same reference numerals are given to the same members, arrangement and the like as in the above embodiment, and the detailed description will be omitted.

A stowage locking mechanism 90 of this embodiment includes the stowage striker 74 disposed on the bottom part of the stowage recess portion 5, the stowage locking member 73 disposed on the rear face side of the seat back 12, the urging spring 46 that urges to the side holding the lock of the stowage locking member 73 all the time, a pulling-up strap 97 attached to the rear face side of the seat cushion 11 in an exposed manner, a stowage link member 96 connected to the pulling-up strap 97 and rotatably (movably) supported on the side of the seat cushion 11, and the stowage unlocking wire 71 connected to the stowage locking member 73 and the stowage link member 96, as a connecting member for operating the stowage locking member 73.

The seat locking device of this embodiment includes at least the stowage unlocking wire 71 of the stowage locking mechanism 90, the stowage locking member 73, the stowage link member 96, and the puling-up strap 97.

The pulling-up strap 97 is a member formed in a ring shape from a wide material with bendable flexibility and a predetermined width similar to the strap 20 and is inserted through two opening portions 98 and 98 disposed on the rear face side of the seat cushion 11 and partially exposed to the rear face of the seat cushion 11 as an operation portion. Also, the strap is connected to a stowage link member 96 inside the seat cushion 11. The pulling-up strap 97 is a returning operating member for pulling up the seat S in the stowed state in the returning operation in this embodiment, and the stowage link member 96 is a movable member in this embodiment.

The returning operation of the seat S in the stowed state is performable by pulling up the pulling-up strap 97 exposed to the rear face of the seat cushion 11, and the operation procedure is visually easy to be understood.

The stowable link member 96 is supported inside the seat cushion 11 rotatably by a rotating shaft 96a in the pulling direction of the pulling-up strap 97, and the pulling-up strap 97 is slidably locked to a strap locking portion 96b formed on one end portion side. To the other end portion side, one end portion of the stowage unlocking wire 71 is locked by a wire locking portion 96c. The stowage link member 96 is urged by an urging spring 47 all the time in the direction to pull the pulling-up strap 97 toward the inside of the seat cushion 11. Therefore, the pulling-up strap 97 exposed to the rear face side of the seat cushion 11 is held in a state without loosening.

The strap locking portion 96b is a plate body formed upstanding on the stowage link member 96 and formed in a substantially C-shape to lock the pulling-up strap 97. By being formed in a substantially C-shape, connection between the pulling-up strap 97 and the stowage link member 96 becomes difficult to be disconnected, and the pulling-up strap 97 is easily attachable.

The strap locking portion 96b has a portion in sliding contact with the pulling-up strap 97 worked smoothly to prevent damage on the pulling-up strap 97.

By slidably locking the pulling-up strap 97, favorable assembling performances are obtained. Also, since the pulling-up strap 97 has a ring shape, whatever position in the pulling-up strap 97 exposed to the rear face of the seat cushion 11 is gripped by a passenger, the pulling-up strap 97 is moved to arrangement in which the operating force is evenly transmitted to both sides, and the returning operation of the seat S is performable with a free attitude.

The pulling-up strap 97 may be configured to prevent sliding, and in this case, it is preferable that the strap locking portion 96b is arranged in parallel with the rear face of the seat cushion 11 and the end portion of the pulling-up strap 97 is fixed to the both end portions thereof. By fixing the pulling-up strap 97 to the strap locking portion 96b, sliding contact spots are eliminated from the pulling-up strap 97, and the life thereof is prolonged.

The opening portions 98 and 98 formed in the rear face of the seat cushion 11 are formed separately in the crosswise direction on the front side of a mounting portion of the front-side leg portion 14, and a protective member (not shown) made of resin worked smoothly is mounted to edge portions of the opening portions 98 and 98 in sliding contact with the pulling-up strap 97 to prevent damage on the pulling-up strap 97. In a region sandwiched by the opening portions 98 and 98, a dent portion 99 is formed so that a passenger's hand is easily insertable when he wants to grip the pulling-up strap 97. The dent portion 99 is formed wider than the width of the pulling-up strap 97 so that the pulling-up strap 97 is grippable from whichever direction of the front and rear sides of the seat cushion 11 one's hand is inserted.

When the seat S is to be stowed, similarly to the above-described embodiment, the rear face side of the seat back 12 is pressed onto the stowage recess portion 5 by the own weight of the seat S, by which the stowage locking member 73 is locked to the stowage striker 74.

In the returning operation of the seat S from the stowed state, by performing the operation in which the passenger grips the pulling-up strap 97 exposed between the opening portions 98 and 98 formed on the rear face of the seat cushion 11 and pull it up in the returning rotating direction, the lock between the stowage recess portion 5 and the seat back 12 is unlocked. That is, by way of the pulling-up operation of the pulling-up strap 97, the stowage link member 96 connected to the pulling-up strap 97 is rotated in the direction to pull the stowage unlocking wire 71. Then, since the stowage unlocking wire 71 connected to the stowage link member 96 is pulled, the stowage locking member 73 is rotated in the unlocking direction, the locking claw 73b is unlocked from the stowage striker 74, and the lock between the stowage recess portion 5 and the seat back 12 is unlocked. The returning operation of the seat S is performable by continuously pulling up the pulling-up strap 97 after that.

As mentioned above, the stowage link member 96 is disposed to be rotated (moved) in conjunction by operating the pulling-up strap 97, which is a returning operating member, and the lock of the stowage locking member 73 is unlockable by pulling the pulling-up strap 97.

Since it is so configured that the pulling-up strap 97 is disposed on the rear face side of the seat cushion 11 and the stowage locking member 73 on the rear face side of the seat back 12, respectively, a seated feeling of a passenger is not affected at all. Also, by attaching the members such as the stowage link member 96, the stowage locking member 73 and the like to the seat frame F, a mechanism with high durability is obtained easily. Moreover, if the cover member made of resin is attached to the rear face sides of the seat cushion 11 and the seat back 12, by configuring a part of the members such as the opening portions 98 and 98, the stowage locking member 73 and the like as a design continuous to the cover member made of resin, durability and designability are both improved.

Since the stowage locking mechanism 90 according to this embodiment has fewer components and a relatively simple structure, its weight is not increased and its favorable assembling performances contribute to cost reduction. Moreover, since the configuration does not have a grip that is gripped when the seat cushion 11 of the seat S in the stowed state is pulled up, making a mounting space smaller, and freedom in design relating to a structure of the seat cushion 11 and a mounting position of the stowage locking mechanism 90 is improved.

According to the seat locking device and the stowable vehicle seat according to various embodiments of the present invention, by locking the seat to the vehicle body floor side in stowage, rattling during driving of the stowable vehicle seat in the stowed state is prevented, and the returning operation load can be reduced. Also, since the returning operating member and the movable member are moved in conjunction and the lock between the seat and the vehicle body floor side is unlocked by the returning operation, operability of the returning operation is improved, and merchantability of the seat can be improved.

In each of the above embodiments, the seat S has a structure that is rotated rearward and stowed, but the same configuration is applicable to a structure that is rotated forward and stowed. Also, in the seat structure in which the seat back 12 is moved and stowed in the folded state without rotation, the same effects are obtainable by configuring such that the stowage locking member 73 is attached to the seat cushion 11 side and the pulling-up grip 77 or the pulling-up strap 97 and the movable member 76 or the stowable link member 96 to the seat back 12 side.

Also, the position of the stowage striker 74 is arrangeable at an arbitrary position on the bottom face or the side face of the stowage recess portion 5, and the position of the stowage locking member 73 is changeable according to that. In the stowage type without having the stowage recess portion 5, the same effect as this embodiment is obtainable by disposing the stowage striker 74 on the vehicle body floor 4 side of the stowage position.

Moreover, in this embodiment, the third-row seats divided into right and left of an automobile was described as a specific example, but not limited to that, it is natural that the similar configuration is also applicable to a long integrally-formed bench-type seat, a passenger's seat or the other rear seats.

Also, in this embodiment, the stowable vehicle seat S in which the stowage and the returning operating element are integrated into the strap 20 was described, but the present invention is also applicable to a seat having a strap and a lever as the operating element.

TABLE OF REFERENCE CHARACTERS

S seat
F seat frame
S1 right-side seat
S2 left-side side
4 vehicle body floor
5 stowage recess portion
11 seat cushion
12 seat back
13 head rest
14 front-side leg portion
20 strap
20a strap outlet portion
21 seat-cushion frame
21a back-frame support portion
22 seat-back frame
22a side frame
22b center frame
23 pillar support portion
24 front-side leg portion frame
25, 26 seat support portion
27 reclining mechanism
28 back plate
28a guiding hole portion
30 link mechanism
31 first link member
31a first shaft portion
31b long hole
32 second link member
32b locking recess portion
33 third link member
33a second shaft portion
34 strap connecting member 34a, 40c, 41c, locking portion
42c
35 locking projection
40 reclining release wire
40a reclining release cable
40b, 41b, 42b end-portion member
41 leg-portion release wire
41a led-portion release cable
42 cancel wire
42a cancel cable
43, 73b locking claw
43a rotating shaft
44 leg-portion striker
45, 46, 47 urging spring
48 coil spring
49 locking rib
70, 90 stowage locking mechanism
71 stowage unlocking wire (connecting member)
72 support portion
73 stowage locking member
73a, 76a, 96a rotating shaft
73c inclination portion
74 stowage striker
76 movable member
76b exposed portion
77 pulling-up grip (returning operating member)
77a gripping portion
77b edge portion
96 stowage link member (movable member)
96b strap locking portion
96c wire locking portion
97 pulling-up strap (returning operating member)
98 opening portion
99 dent portion

The invention claimed is:

1. A seat locking device that, in stowage of a stowable vehicle seat that can be stowed on a vehicle body floor side in a state in which a seat back is folded onto a seat cushion, locks and unlocks said stowable vehicle seat side and said vehicle body floor side, comprising:
  a stowage locking member disposed on said stowable vehicle seat side and that is lockable to and unlockable from said vehicle body floor side during stowage of said stowable vehicle seat;
  a returning operating member disposed on said stowable vehicle seat side and operable in a returning operation of said stowable vehicle seat;
  a movable member disposed on said stowable vehicle seat side and movable in conjunction with the returning operation; and
  a connecting member that connects said stowage locking member and said movable member, wherein
  said stowage locking member is unlockable through said connecting member by movement of said movable member in the returning operation.

2. The seat locking device according to claim 1, wherein:
  said stowable locking member is movable and is urged in a direction for locking to said vehicle body floor side all the time; and
  said movable member is moved in a direction opposite to the direction to urge said stowage locking member through said connecting member all the time by an operation of said returning operating member.

3. The seat locking device according to claim 1, wherein:
  said stowage locking member is disposed on a rear face side of said seat back; and
  said returning operating member and said movable member are disposed on a rear face side of said seat cushion.

4. The seat locking device according to claim 1, wherein:
  said returning operating member has a gripping portion; and
  said movable member has an exposed portion partially exposed from said gripping portion that is operable and is attached to said returning operating member and moved by a force applied to said exposed portion when said gripping portion is gripped.

5. The seat locking device according to claim 1, wherein:
  said returning operating member is a flexible member having a predetermined width; and
  said movable member is connected to said returning operating member, having said returning operating member locked to a locking portion, and is movable by pulling said returning operating member.

6. The seat locking device according to claim 5, wherein:
  said returning operating member is attached by being inserted through both of two opening portions disposed separately on a rear face side of said seat cushion.

7. A stowable vehicle seat, comprising:
  a seat locking device that, in stowage of a stowable vehicle seat that can be stowed on a vehicle body floor side in a state in which a seat back is folded onto a seat cushion, locks and unlocks said stowable vehicle seat side and said vehicle body floor side, said seat locking device comprising:
    a stowage locking member disposed on said stowable vehicle seat side and that is lockable to and unlockable from said vehicle body floor side during stowage of said stowable vehicle seat;
    a returning operating member disposed on said stowable vehicle seat side and operable in a returning operation of said stowable vehicle seat;
    a movable member disposed on said stowable vehicle seat side and movable in conjunction with said returning operating member in the returning operation; and
    a connecting member that connects said stowage locking member and said movable member, wherein
    said stowage locking member is unlockable through said connecting member by movement of said movable member in the returning operation.

* * * * *